United States Patent [19]

Whitman

[11] Patent Number: 4,724,585
[45] Date of Patent: Feb. 16, 1988

[54] WHEELWELL MOLDING RETAINER CLIP

[76] Inventor: Clinton R. Whitman, 208 NW. 80th Ter., Margate, Fla. 33063

[21] Appl. No.: 927,271

[22] Filed: Nov. 5, 1986

[51] Int. Cl.[4] ............................................. B62D 25/16
[52] U.S. Cl. ................................... 24/295; 301/37 R; 280/153 R
[58] Field of Search ............. 24/295; 301/37 R, 37 B; 280/153 R, 153 B; 293/128

[56] References Cited

U.S. PATENT DOCUMENTS

| | | | |
|---|---|---|---|
| 3,012,822 | 12/1961 | Mulhern | 301/37 R |
| 3,631,569 | 1/1972 | Seckerson et al. | 24/295 |
| 3,970,346 | 7/1976 | Kretschmer | 301/37 R |
| 4,174,850 | 11/1979 | Hart | 280/153 R |
| 4,215,873 | 8/1980 | Price | 280/153 R |
| 4,296,530 | 10/1981 | Muller et al. | 24/295 |
| 4,402,118 | 9/1983 | Benedetti | 24/295 |
| 4,514,003 | 4/1985 | Guy | 24/295 |

FOREIGN PATENT DOCUMENTS

| | | | |
|---|---|---|---|
| 1107797 | 1/1956 | France | 24/295 |
| 849736 | 9/1960 | United Kingdom | 24/295 |

Primary Examiner—Victor N. Sakran
Attorney, Agent, or Firm—Malin, Haley & McHale

[57] ABSTRACT

A mounting and retaining clip for, inter alia, mounting decorative molding around the perimeter of an automobile wheel well opening. When in use said clip is only visible upon inspection from below or within the wheel well opening. The clip is comprised of a single piece of stamped sheet material (i.e.: stainless steel) bent into generally a curved C-shape, the curved portion comprising a central connecting web for first and second end portions. The center web section has a generally planar or slightly curved biasing prong connected thereto which acts as a retainer biasing means. The first end portion of the C-shape has a downwardly angled edge portion which acts as a projection receiving means adapted to firmly engage a corresponding projection disposed in the piece of trim or molding sought to be mounted. The biasing means acts to maintain said downwardly angled edge portion in firm engagement with said projections. The second end portion has at least one fender well lip engaging surface.

2 Claims, 8 Drawing Figures

WHEELWELL MOLDING RETAINER CLIP

BACKGROUND OF THE INVENTION

1. Field of the Invention

The present invention relates to fastening devices and more particularly to a combination wheel well molding and retaining clip for, inter alia, mounting decorative or protective molding around, for instance, the perimeter of an automobile wheel well opening. Said clip is not detectable by ordinary visual inspection when used to hold a piece of trim in place and therefore will not detract from the asthetic appearance of the automobile to which it is attached.

2. Prior Art

It is well known to fit one member to another member using a clip means. Examples of past efforts are embodied in the following U.S. Patents found in a preliminary patent search in class 294, subclass 296: U.S. Pat. Nos. 2,986,793, 4,092,766, 4,514,003, 3,208,119, 4,275,919, 3,970,346, and 4,402,118.

None of these fasteners, however, utilize the static coaction of a biasing means for maintaining firm contact between a projection on the molding and a corresponding projection receiving means on said clip means while remaining visually undetectable.

A further advancement over the prior art resides in the U-shaped connecting web having therein a biasing prong.

SUMMARY OF THE INVENTION

In accordance with the instant invention, decorative molding to be fitted around the periphery of a wheel well opening of an automobile is held firmly and removably in place around said periphery by the combination of an elongated projection extending from the underside or tire facing surface of the molding and a C-shaped spring clip having a projection receiving recess, said clip having a biasing prong which urges the projection receiving recess against the projection, thereby firmly holding the molding to the automobile body. In this way, the molding is held firmly against rattling, and by using a plurality of said clips with corresponding projections, flexure of the automobile body will not cause the molding to separate from the body. Said clips are removable and reuseable.

It is therefore a primary object of the present invention to provide a simple but effective means for mounting decorative or protective molding around the periphery of an automobile wheel well opening, said means being undetectable by ordinary visual inspection.

It is another object of the present invention to provide a vehicle wheel well molding having a plurality of projections each adapted to engage a spring clip connecting means for connection to an automobile body.

It is a further object of the present invention to provide a reuseable spring retainer clip means for connecting molding to a vehicle body along a path of any shape.

DETAILED DESCRIPTION OF THE PREFERRED EMBODIMENT

Figure 1:
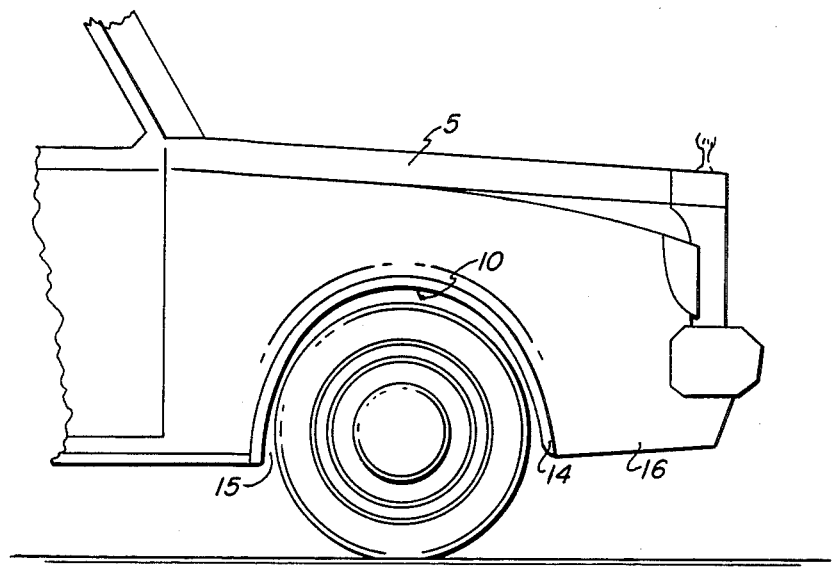
FIG. 1 is a side elevational view of decorative wheel well molding being held in place on an automobile fender.
Figure 2:
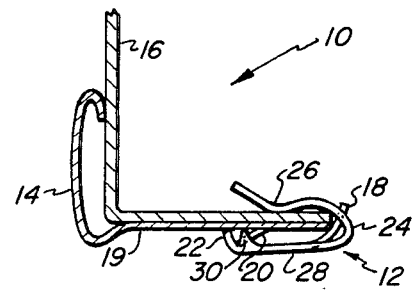
FIG. 2 is a partial cutaway view of the clip and molding arrangement mounted on a fender well inner lip.
Figure 3:
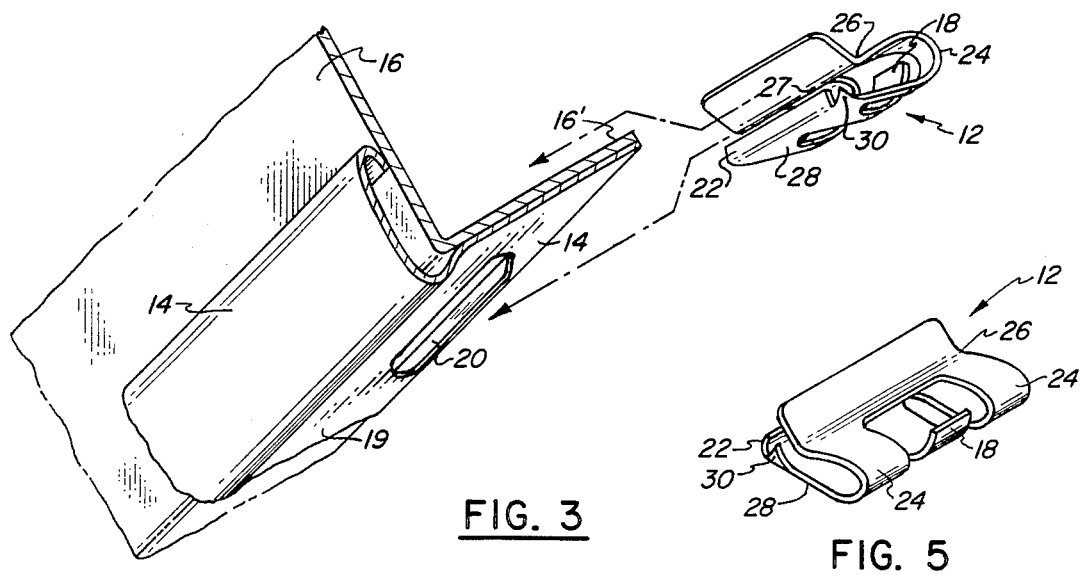
FIG. 3 is a perspective view of the clip and clip retaining projection of the molding.

Referring now to the drawings, the invention is designated generally by the numeral 10, and is comprised, as shown in FIGS. 1, 2 and 3, of a clip 12 adapted to connect decorative or protective molding 14 to an automobile body 5, preferably around the periphery of a wheel well opening 15 of fender 16.

Figure 5:
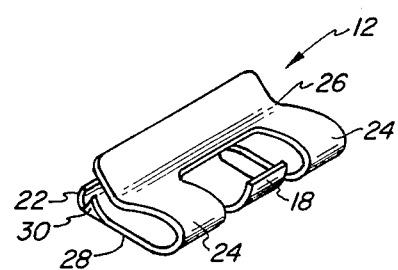
FIG. 5 is a photograph of the clip.

Clip 12 is generally C-shaped in cross-section, having a first end portion 28, a second end portion 26, and a central connecting web portion 24 comprised of at least two parallel 180° bends integrally connected with each end portion. Said bends allow clip 12 to be flexed about the elongate axis common to both bends. End portion 26 has a partial U-shape in cross section as seen in FIG. 5 and has an inner surface portion 27 adapted to contact a corresponding surface portion 16' of body 16. Surface 16' is the inner facing surface of automobile fender 16. End portion 18 is generally flat and has its outermost elongate edge 22 bent inward at at least a right angle and is adapted to engage a projection 20 which extends outward and downward from the tire facing surface 19 of molding 14.

Figure 4:
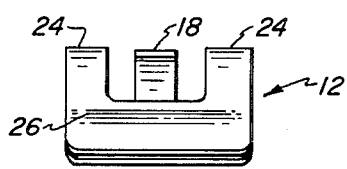
FIG. 4 is a top plan view of the clip.
Figure 7:
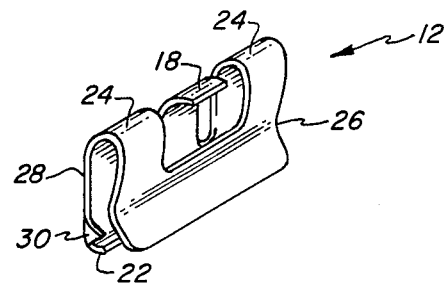
FIG. 7 is another photograph of the clip showing a slightly different embodiment.

Clip 12 has a cutout central portion disposed between web sections 24, as seen in FIGS. 4 and 7, with the exception of a biasing prong 18 which extends outward from first end portion 28 and is preferably slightly curved.

Figure 8:
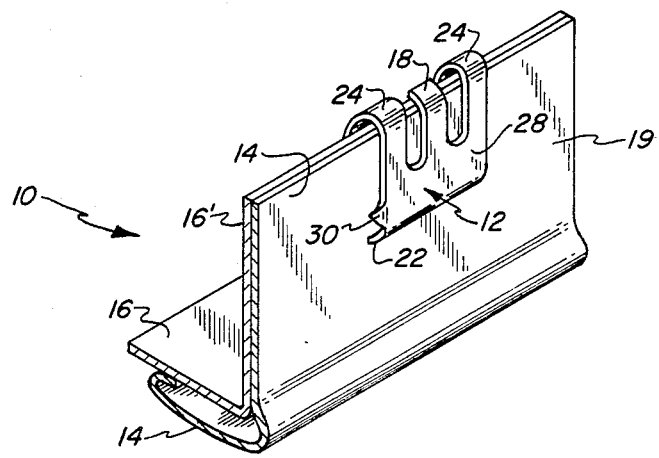
FIG. 8 is a photograph of a clip connecting a section of molding to a portion of an automobile fender.

The molding 14 to be mounted to, for instance, the periphery of a wheel well opening 15 of an automobile, has a small elongated projection 20 extending outward and downward of the tire facing or underside surface 19 of molding 14. Said projection 20 is adapted to engage the inner surface of edge 22, as shown in FIGS. 2 and 8.

Figure 6:
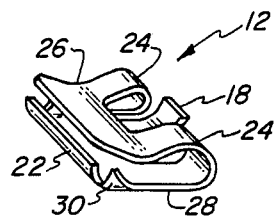
FIG. 6 is another photograph of the clip showing additional features.

Clip 12 may be provided with gripping tangs 30, shown in FIGS. 3 and 6, to resist lateral movement of clip 12 relative to molding 14. Tangs 30 engage the respective side edges of projection 20 to prevent clip 12 from sliding from side to side.

In the most practical and preferred embodiment, molding 14 is placed around the wheel well periphery. A plurality of projections 20 may be provided therein for connection to a corresponding number of clips. Clip 12 is then placed with the open end of the C-shape passing over the inner fender lip/molding combination into position by snapping bent edge 22 over projection 20 thereby engaging surface 27 against the corresponding portion of surface 16'. Prong 18 should be sized and shaped so that when projection 20 is engaged by the inner surface of edge 22, the inherent resiliency of prong 18 exerts a steady force tending to urge edge 22 against projection 20.

The lower surface 27 of second end portion 26 engages the inner surface 16' of fender 16 to provide a squeezing force between the meeting surfaces of fender 16 and molding 14.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A combination molding and mounting clip, comprised of:
    a section of decorative molding having a small elongated projection extending outwardly and downwardly therefrom;
    a C-shaped spring clip having a projection receiving recess connected to a first end portion, said clip adapted to concealingly connect said molding to a section of an automobile body having a lip portion with an edge;
    a resilient biasing prong connected to said clip adapted to engage said lip edge and to thereby urge said projection receiving recess against said projection to retain said molding in connection with said automobile; and
    further comprising a pair of inwardly directed tong means for preventing side to side sliding movement of spring clip with respect to said molding, connected to said first end portion on opposite sides of said projection receiving recess.

2. The combination as recited in claim 1, wherein:
    said biasing prong is integrally connected to said first end portion and has a radius of curvature less than said C-shape;
    said clip being comprised of a second end portion generally parallel and spaced from said first end portion and adapted to engage a wheel well opening lip of said automobile body, and a central web portion connected therebetween, said web portion defining generally a single 180° bend.

* * * * *